(12) United States Patent
Srinivansan

(10) Patent No.: US 7,792,095 B2
(45) Date of Patent: Sep. 7, 2010

(54) VOIP AND ASSOCIATED DATA DELIVERY

(75) Inventor: Thiru Srinivansan, Highlands Ranch, CO (US)

(73) Assignee: The Boeing Company, Chicago, IL (US)

( * ) Notice: Subject to any disclaimer, the term of this patent is extended or adjusted under 35 U.S.C. 154(b) by 124 days.

(21) Appl. No.: 11/278,218

(22) Filed: Mar. 31, 2006

(65) Prior Publication Data
US 2007/0263602 A1 Nov. 15, 2007

(51) Int. Cl.
 H04L 12/66 (2006.01)
(52) U.S. Cl. .................. 370/352; 379/222; 379/265.01; 379/265.02; 705/37
(58) Field of Classification Search ............ 379/265.01, 379/222, 201.01, 265.02; 455/508; 703/37; 370/352
See application file for complete search history.

(56) References Cited

U.S. PATENT DOCUMENTS

| 6,317,722 | B1* | 11/2001 | Jacobi et al. ................... 705/14 |
| 6,760,429 | B1 | 7/2004 | Hung et al. |
| 6,760,727 | B1* | 7/2004 | Schroeder et al. ............. 707/10 |
| 7,103,566 | B2* | 9/2006 | Silva et al. ..................... 705/26 |
| 2003/0053615 | A1 | 3/2003 | Anderson et al. |
| 2004/0083267 | A1 | 4/2004 | Thompson |
| 2007/0116238 | A1* | 5/2007 | Jacobi et al. ........... 379/265.01 |
| 2007/0287488 | A1* | 12/2007 | Faber et al. .................. 455/508 |

FOREIGN PATENT DOCUMENTS

| EP | 0829996 A2 | 3/1998 |
| EP | 1054554 A2 | 11/2000 |
| GB | 2359215 A | 8/2001 |
| WO | 9914930 | 3/1999 |
| WO | 0044159 | 2/2000 |
| WO | 0244864 A2 | 6/2002 |

OTHER PUBLICATIONS

"Fake Caller IDs Proliferating," Mar. 1, 2006, retrieved from Internet from http://www.cbsnews.com/stories/2006/03/01/tech/main136156.1.shtml on Mar. 30, 2006, CBS News.
"Faked Caller ID Info," May 9, 2000, http://yarchive.net/phone/sprint_ani.html, retrieved from Internet on Mar. 30, 2006.
"Google tests out Click-to-Call AdWords," Nov. 23, 2005, retrieved from Internet from http://www.yardley.ca/blog/index.php/archives/2005/11/23/google-tests-out-click-to-call-adwords/ on Mar. 30, 2006.
"Reports | Automated Caller ID / ANI Spoofing," Jul. 2004, retrieved from Internet from http://www.rootsecure.net/?p=reports/callerid_spoofing on Mar. 30, 2006.
UK Combined Search and Examination Report for Application No. GB0705032.1; Jul. 10, 2007; 9 pages.

* cited by examiner

Primary Examiner—Melur Ramakrishnaiah
Assistant Examiner—Yosef K Laekemariam
(74) Attorney, Agent, or Firm—Armstrong Teasdale LLP

(57) ABSTRACT

Implementations are described that are capable of adding information associated with one or more items and/or products to a virtual shopping cart associated with an entity, such as a customer browsing a website. The described implementations may detect a request to establish a Voice over Internet Protocol (VoIP) communications session, the request made by the entity, and retrieve product data associated with the information in the virtual shopping cart. The product data may be bundled with VoIP session parameters usable to establish a VoIP communications session with the entity.

15 Claims, 5 Drawing Sheets

VOIP AND ASSOCIATED DATA DELIVERY

FIELD OF THE INVENTION

This invention relates to computer telephony integration, and more specifically, to Voice over Internet Protocol (VoIP) technology.

BACKGROUND

Caller Identity Display, known commonly as Caller ID, is often used by merchants to retrieve stored customer data when a customer contacts a merchant. The data may be transferred to an agent that is charged with handling the needs of the customer. Therefore, the agent has the customer's information before dialog with the customer begins. The conventional technology that coordinates the described process is called computer telephony integration.

Online purchasing of goods and services has undergone significant growth over the past years. Instead of using conventional telephones to contact merchants, customers often browse many ecommerce merchant websites before purchasing goods and services. These ecommerce merchant websites enable customers to select and purchase goods in a generally convenient manner.

Many online entities, including ecommerce merchants, employ the use of Voice over Internet Protocol (VoIP) technology that is capable of routing voice conversations over the Internet. VoIP technology encodes analog voice into digital signals that may be communicated over the packet-switched network technology that is used by the Internet. VoIP technology may enable online entities to communicate with users of the Internet, but the technology is unable to accommodate various needs of ecommerce merchants.

SUMMARY

Implementations are described that are capable of adding information associated with one or more items/products to a virtual shopping cart associated with an entity, such as a customer browsing a website. The described implementations may detect a request to establish a Voice over Internet Protocol (VoIP) communications session, the request made by the entity, and retrieve product data associated with the information in the virtual shopping cart. The product data may be bundled with VoIP session parameters usable to establish a VoIP communications session with the entity.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

The following disclosure describes an online environment that enables users to browse ecommerce websites that offer goods for purchase. In one implementation, a customer browses an ecommerce website and selects goods that are offered for purchase. The goods are placed in a virtual shopping cart associated with the customer. The website may include a Voice over Internet Protocol (VoIP) communications button that enables the customer to establish a VoIP communications session with an agent of the website. In one implementation, clicking on the VoIP button causes data associated with the goods contained in the shopping cart to be delivered to an agent before the VoIP communications session is initiated. In another implementation, clicking on a VoIP button associated with goods offered for purchase on a website causes data associated with the goods to be delivered to an agent before the VoIP communications session is initiated. In general, delivery of the data associated with the goods may accelerate the process of purchasing goods online.

An exemplary online environment that enables users to browse ecommerce websites that offer goods for purchase is described first in the following description. The foregoing is followed by additional description related to processes for establishing VoIP communications sessions that are proceeded by delivery, to an agent, of product data associated with one or more goods offered for sale on a website. Finally, a general computing device is discussed.

Exemplary Online Environment

This section provides a reader with an overview of a number of different devices/entities that may be part of an online environment that allows computing devices to communicate with website agents using Voice over Internet Protocol (VoIP) technology.

Figure 1:
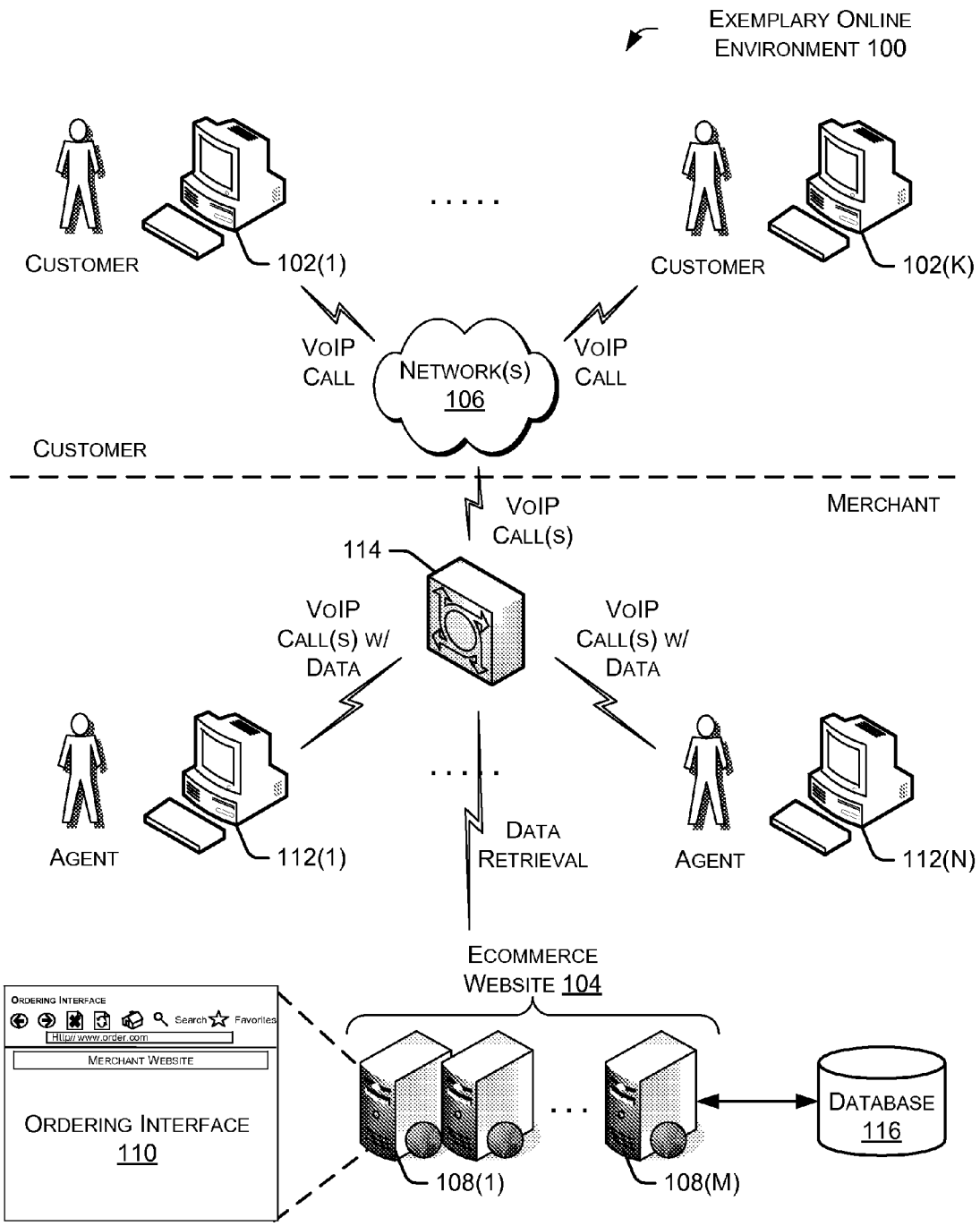
FIG. 1 illustrates an exemplary online environment in which customers may purchase goods and/or services from ecommerce merchants. The environment includes at least one computing device capable of connecting to a number of ecommerce websites that offer goods and/or services for purchase. In one implementation, a computing device operated by a customer establishes a Voice over Internet Protocol (VoIP) communications session with an ecommerce merchant before finalizing a purchase for goods.

FIG. 1 illustrates an exemplary online environment 100 that includes ecommerce merchants that offer goods and/or services to customers. In the environment 100, one or more customer computing devices 102(1), ..., 102(K) can access a website 104 via a network 106. In one implementation, a customer uses the customer computing device 102 and the network 106 to interface with the website 104 to purchase goods offered for sale on the website 104. The network 106 is representative of many different types of networks, such as cable networks, the Internet, conventional phone networks, and wireless networks.

The website 104 is hosted on one or more servers 108(1), ..., 108(M), perhaps arranged as a server farm. Other server architectures may also be used to host the website 104. The website 104 is capable of handling requests from many users and serving, in response, various web pages and/or user interfaces that can be rendered on the computing device 102. The website 104 is representative of essentially any site supporting user interaction, including online retailers and other ecommerce merchants, informational sites, search engine sites, news and entertainment sites, phone, cable, or utility company sites, and so forth. In one implementation, the website 104 is an ecommerce shopping portal that sells many different wares to customers that shop online.

The computing devices 102 (also referred to as "client computers," "customer computers," or simply "clients" or "customers") are illustrated as personal computers, but may also be implemented as other devices, such as wireless phones, tablet computers, set-top boxes, game consoles, laptop computers, portable digital assistants (PDA), and so forth. The computing devices 102 are equipped with one or more processors and memory to store applications and data. A browser application may be stored in the memory and executes on a processor to provide access to the website 104. The browser renders web pages served by the website 104 on an associated display. One such web page is an ordering interface 110.

When a customer directs a client 102 to request one or more web pages and/or interfaces from the website 104, the computing device 102 sends Uniform Resource Locator (URL) requests to the servers 108. Upon receiving a URL request, the servers 108 return a web page back to the requesting client computer 102. The computing device 102 invokes a browser to render the web page, allowing the customer to interact with the web page. In one implementation, a web page that includes the ordering interface 110 is returned to a requesting client device 102.

One or more agents, using agent computing devices 112(1), ..., 112(N), may be associated with the ecommerce website 104 and more generally with the merchant that manages or owns the website 104. The agents may be responsible for handling customer service issues, such as, assisting customers with orders placed using the order interface 110, discussing products over both conventional telephony (not shown) and VoIP communications sessions, and addressing other questions or concerns that customers may have.

The agent computing devices 112 (also referred to as "agent computers," or simply "agents") are illustrated as personal computers, but may also be implemented as other devices, such as wireless phones, tablet computers, set-top boxes, game consoles, laptop computers, portable digital assistants (PDA), and so forth. The agent computing devices 112 are equipped with one or more processors and memory to store applications and data. A browser application may be stored in the memory and executes on a processor to provide access to the website 104. The browser renders web pages, or other application interfaces, served by the website 104 on an associated display.

The agent computing devices 112 are able to communicate with a VoIP communications server 114. The VoIP communications server 114 may be embodied as any conventional VoIP communications server 114 that enables entities to communicate encoded voice signals (packaged) over the network 106. In one implementation, a customer uses the client computer 102 to communicate using VoIP with an agent interfaced with the agent computer 112. As will be discussed below, in one implementation, an agent may also be routed product data for display on the agent computer 112 and for consideration during a VoIP communications session with a customer. Such data may relate to products placed in a virtual shopping cart connected to the ordering interface 110 and/or products offered for sale via the website 104. The data routed to the agent may also include additional product data that may be related to the products in the shopping cart. The agent may use this additional product data to offer other products to a customer once the VoIP communications session is established.

The website 104 may also be connected to a database 116. The database is capable of storing data associated with products offered for sale on the website 104, products placed in customers' virtual shopping carts, customer logon and related data, such as billing, trouble with service, and scheduling service, and other data associated with the ecommerce website 104. In one implementation, data stored in the database 116 is retrieved and sent to the agent computer 112 when a customer initiates a VoIP communications session via the website 104 and which is facilitated by the VoIP server 114.

Exemplary Processes

FIGS. 2-5 illustrate exemplary processes that enable a customer to establish a VoIP communications session with an agent of an ecommerce merchant that has a presence on the Internet. The processes are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For discussion purposes, the processes are described with reference to the exemplary online environment of FIG. 1. In particular, many acts described below may be implemented and performed by various customer and merchant side devices illustrated in FIG. 1.

Figure 2:
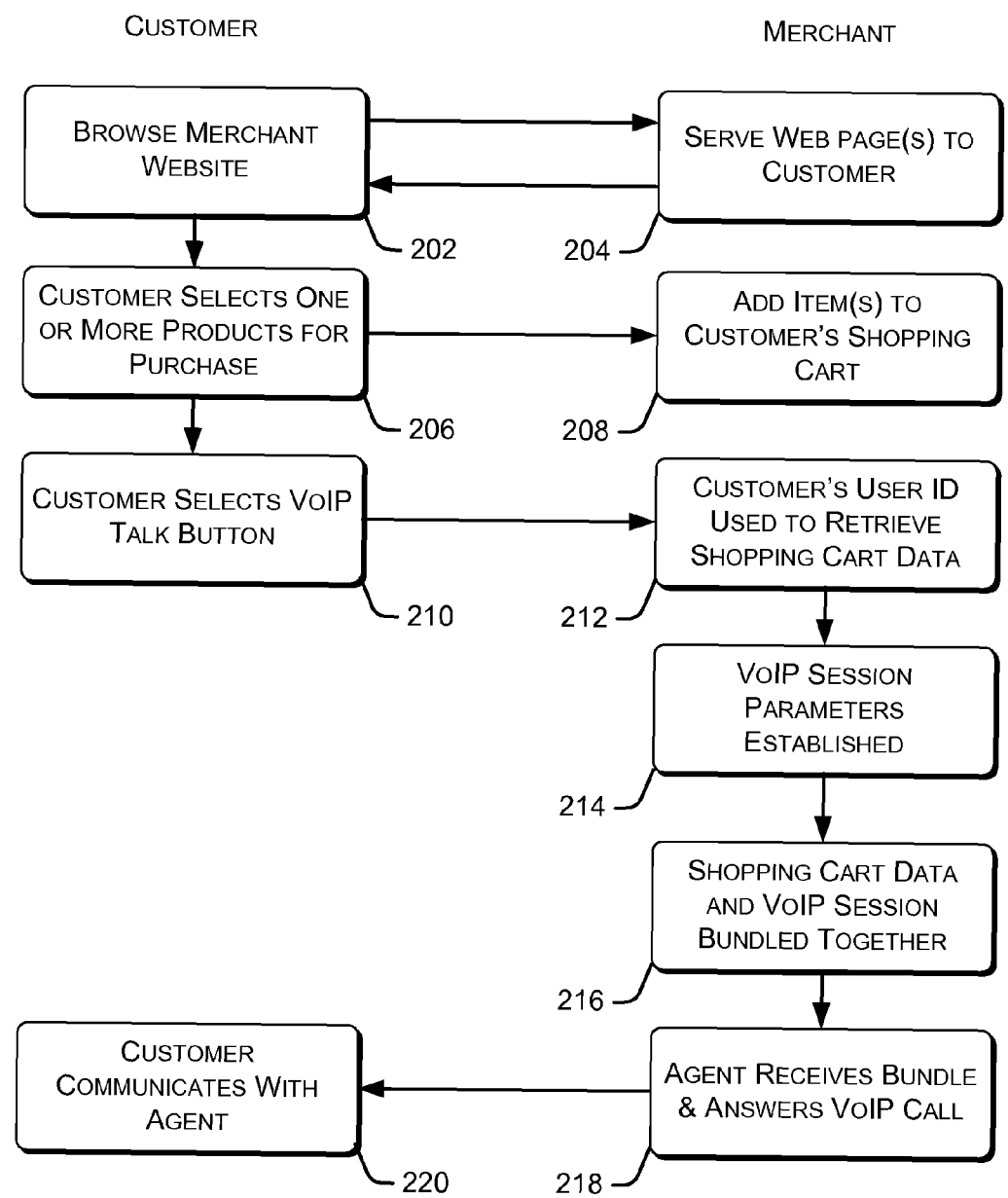
FIG. 2 illustrates a flow diagram of a process for establishing a VoIP communications session between a registered customer and an agent of an ecommerce website. Data associated with a potential purchase of goods may be communicated to the agent before the VoIP communications session begins.

FIG. 2 illustrates an exemplary process for establishing a VoIP communications session between a registered customer of a website and an agent of the website. In one implementation, a registered customer of a website may be a customer that has completed a registration process that asks the customer to supply address and billing information (e.g., credit card information), and so forth. The website may issue a unique username or user ID and a password to the customer after the registration process is fulfilled. The username/user ID and password may be used by the customer to log on to the website.

Referring to FIG. 2, at block 202, a customer using a client computing device 102 browses the website 104. At block 204, the website 104 serves one or more web pages to the client computing device 102. Such web pages may include the ordering interface 110 that lists a number of products offered for sale by the website 104.

At block 206, the customer selects one or more products that they may decide to purchase. The customer selects the one or more products by clicking on a web page link associated with the one or more products. In response to the customer's product selection(s), at block 208, the website 104 adds the selected products to a virtual shopping cart associated with the customer. The website may store the virtual shopping cart in the database 116. In one implementation, the website 104 links virtual shopping carts to registered customers' unique username, user ID, or other identification data that was assigned to the registered customers at the end of a registration process.

At block 210, the customer selects a VoIP talk button that is associated with the ordering interface 110. At block 212, in response to the selection of the VoIP talk button, the website 104 uses the customer's user ID, or other unique identification data, to retrieve product data associated with the product(s) that are in the customer's shopping cart. The database 116 is accessed in the retrieval process of block 212. At block 214, the VoIP server 114 establishes the session parameters that may be needed to allow the customer to communicate with an agent interfacing with an agent computer 112. At block 216, the VoIP server 114 bundles the session parameters and the product data retrieved at block 212. Information about the customer, such as address and billing information, may also be bundled with the session parameters and the product data.

At block 218, the agent receives, via the agent computer 112, the bundled session parameters and the product data from the VoIP server 114. In one implementation, the agent computer 112 invokes a window, application window, or other graphical interface for displaying the product data associated with the products in the customer's shopping cart. Such an interface is displayed on a display device associated with the agent computer 112. At substantially the same time, or shortly after the product data is displayed, the agent computer 112 uses the VoIP session parameters to begin a VoIP communications session with the customer.

At block 220, the customer begins to communicate with the agent by way of the VoIP session. Because data associated with the products in the customer's shopping cart are readily available, the agent can quickly address the customer's questions and/or concerns. The agent may also assist the customer with the purchasing of the products in the customer's shopping cart.

Figure 3:
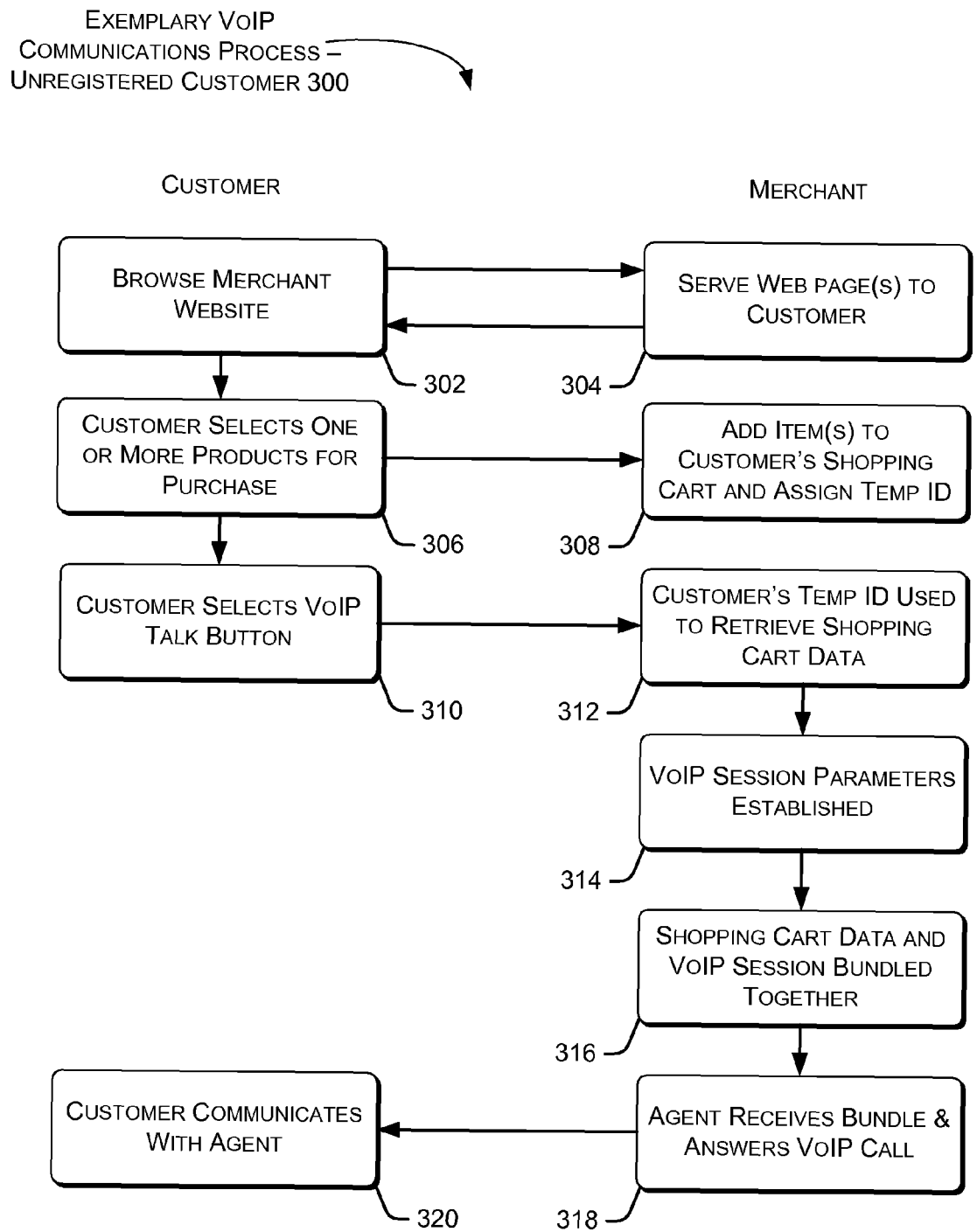
FIG. 3 illustrates a flow diagram of a process for establishing a VoIP communications session between an unregistered customer and an agent of an ecommerce website. Data associated with a potential purchase of goods may be communicated to the agent before the VoIP communications session begins.

FIG. 3 illustrates an exemplary process for establishing a VoIP communications session between an unregistered customer browsing a website and an agent of the website. In one implementation, an unregistered customer browsing a website may be a customer that has not completed a registration process that asks the customer to supply address and billing information (e.g., credit card information), and so forth. Or, the website that the customer is contacting may not employ a registration process.

Referring to FIG. 3, at block 302, an unregistered customer using a client computing device 102 browses the website 104. At block 304, the website 104 serves one or more web pages to the client computing device 102. Such web pages may include the ordering interface 110 that lists a number of products offered for sale by the website 104.

At block 306, the unregistered customer selects one or more products that they may decide to purchase. The unregistered customer selects the one or more products by clicking on a web page link associated with the one or more products. In response to the unregistered customer's product selection(s), at block 308, the website 104 adds the selected products to a virtual shopping cart associated with the unregistered customer. In one implementation, the process of associating the shipping cart with the unregistered customer generally involves assigning unique identification data (e.g., a temporary ID) to the unregistered customer. The temporary ID is also linked to the unregistered customer's shopping cart. The website may store the virtual shopping cart in the database 116.

At block 310, the unregistered customer selects a VoIP talk button that is associated with the ordering interface 110. At block 312, in response to the selection of the VoIP talk button, the website 104 uses the unregistered customer's temporary ID, or other unique identification data, to retrieve product data associated with the product(s) that are in the unregistered customer's shopping cart. The database 116 is accessed in the retrieval process of block 312. At block 314, the VoIP server 114 establishes the session parameters that may be needed to allow the unregistered customer to communicate with an agent interfacing with an agent computer 112. At block 316, the VoIP server 114 bundles the session parameters and the product data retrieved at block 312.

At block 318, the agent receives, via the agent computer 112, the bundled session parameters and the product data from the VoIP server 114. In one implementation, the agent computer 112 invokes a window, application window, or other graphical interface for displaying the product data associated with the products in the unregistered customer's shopping cart. Such an interface is displayed on a display device associated with the agent computer 112. At substantially the same time, or shortly after the product data is displayed, the agent computer 112 uses the VoIP session parameters to begin a VoIP communications session with the unregistered customer.

At block 320, the unregistered customer begins to communicate with the agent by way of the VoIP session. Because data associated with the products in the unregistered customer's shopping cart are readily available, the agent can quickly address the unregistered customer's questions and/or concerns. The agent may also assist the customer with the purchasing of the products in the customer's shopping cart.

Figure 4:
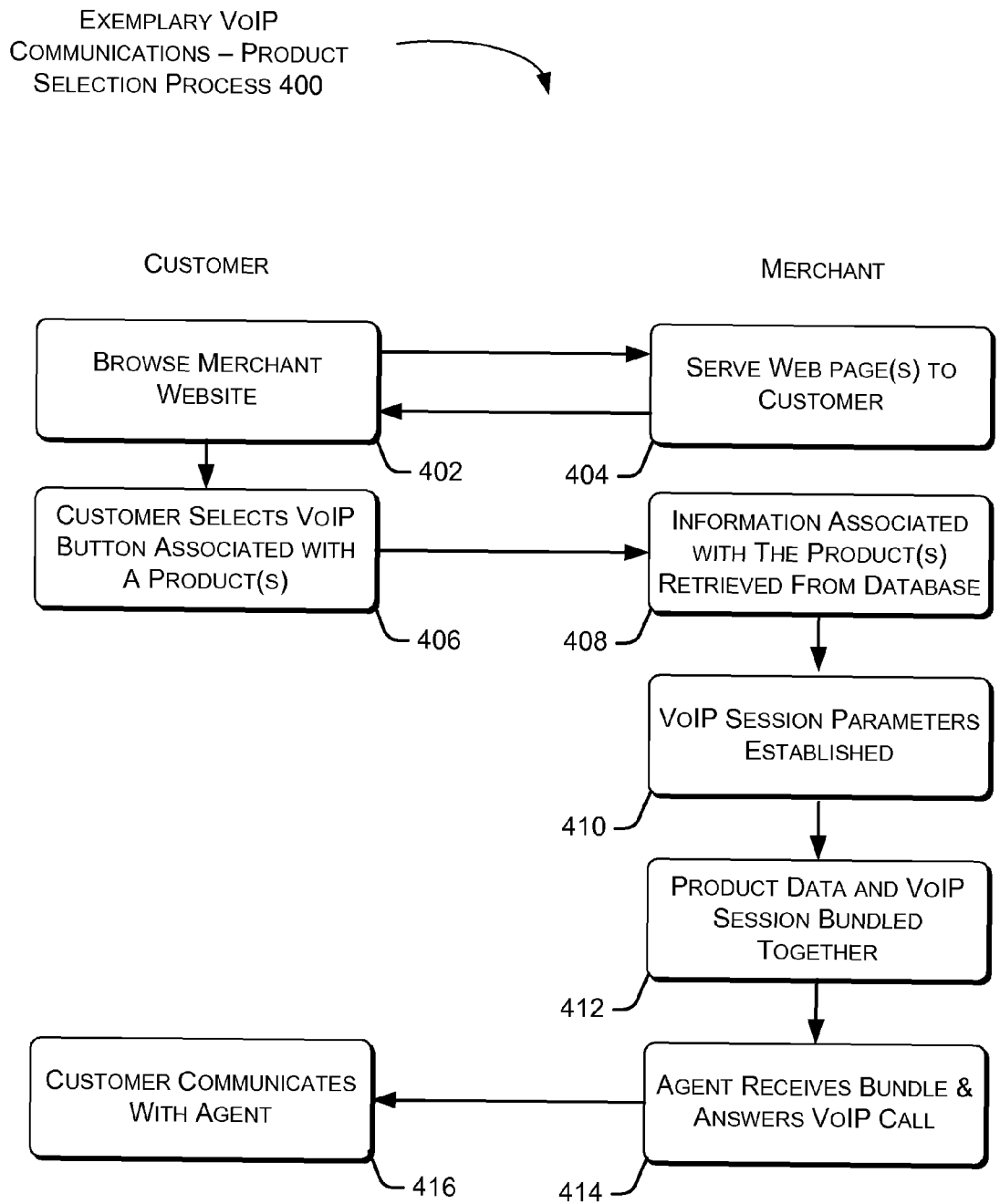
FIG. 4 illustrates a flow diagram of a process for establishing a VoIP communications session between a potential customer and an agent of an ecommerce website. Data associated with one or more goods may be communicated to the agent before the VoIP communications session begins.

FIG. 4 illustrates an exemplary process for establishing a VoIP communications session between a potential customer browsing a website and an agent of the website. In one implementation, a potential customer browsing a website may see one or more products that are of interest. The website employs VoIP communications technology that enables the potential customer to request additional product information, related to products of interest, from an agent associated with the website. Before a VoIP session is established between the potential customer and the agent, the agent may receive product data that is associated with products that are of interest to the potential customer.

Referring to FIG. 4, at block 402, a potential customer using a client computing device 102 browses the website 104. At block 404, the website 104 serves one or more web pages to the client computing device 102. Such web pages may include the ordering interface 110 that lists a number of products offered for sale by the website 104.

At block 406, the potential customer selects a VoIP talk button that is associated with one or more products listed on the interface 110. In response to the potential customer's VoIP talk button selection, at block 408, the website 104 accesses the database 116 and retrieve additional product data. In one implementation, the additional product data retrieved from the database 116 relates to the one or more products that the VoIP talk button is associated with.

At block 410, the VoIP server 114 establishes the session parameters that may be needed to allow the potential customer to communicate with an agent interfacing with an agent computer 112. At block 412, the VoIP server 114 bundles the session parameters and the additional product data retrieved at block 408.

At block 414, the agent receives, via the agent computer 112, the bundled session parameters and the additional product data from the VoIP server 114. In one implementation, the agent computer 112 invokes a window, application window, or other graphical interface for displaying the additional product data associated with the products of interest to the potential customer. Such an interface is displayed on a display device associated with the agent computer 112. At substantially the same time, or shortly after the additional product data is displayed, the agent computer 112 uses the VoIP session parameters to begin a VoIP communications session with the potential customer.

At block 416, the potential customer begins to communicate with the agent by way of the VoIP session. Because the additional data associated with the products of interest to the potential client are readily available, the agent can quickly address the potential customer's questions and/or concerns. The agent may also assist the customer with the purchasing of products offered for sale by way of the website 104.

Exemplary Computing Device

Figure 5:
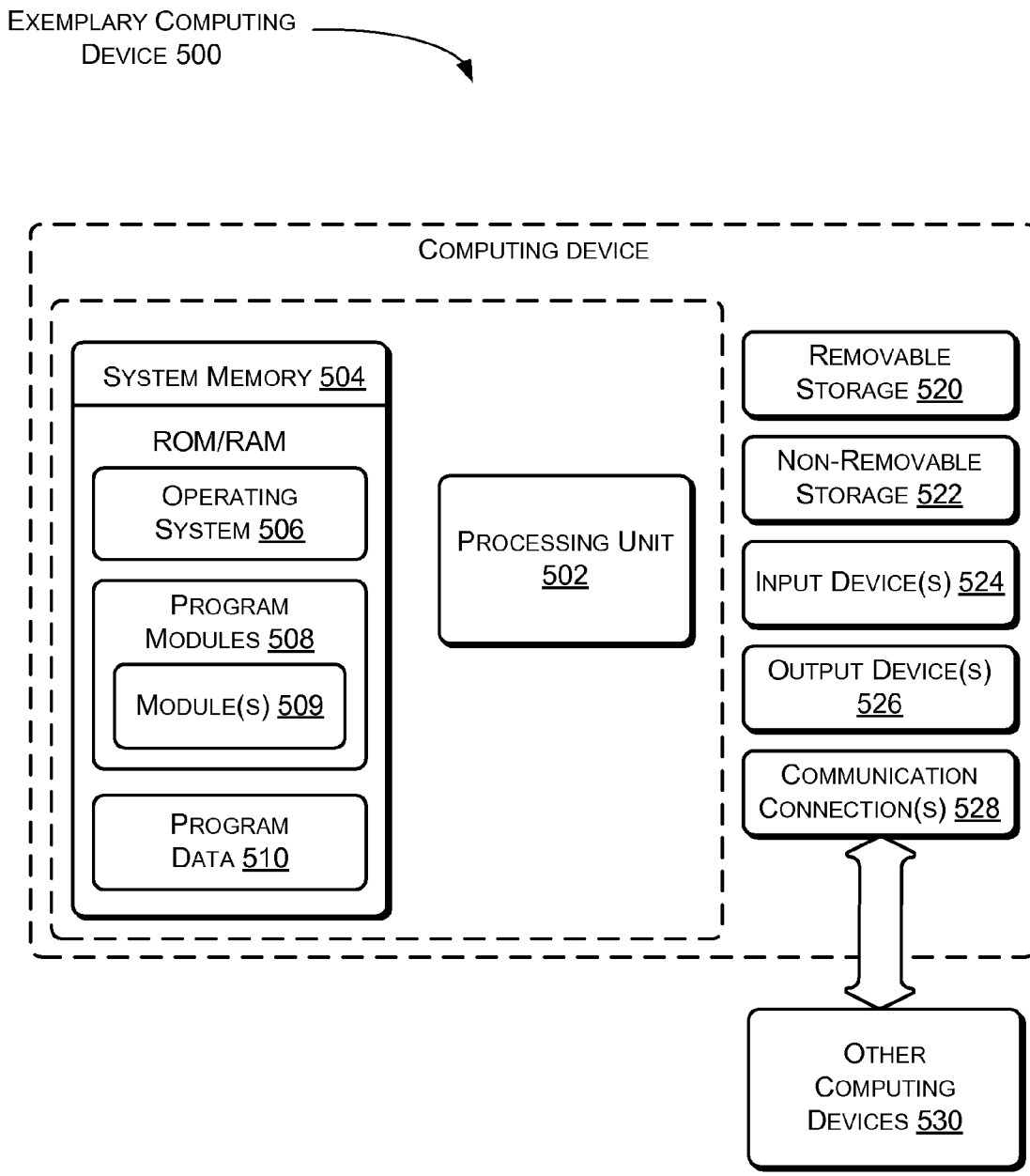
FIG. 5 is a block diagram illustrating functional components in a computing device that might be used to implement the devices illustrated in FIG. 1.

FIG. 5 is an illustrative computing device that may be used to implement the client computing device 102 and the agent computing device 112. The illustrated computing device may also be used to implement the other devices illustrated in FIG. 1. In a very basic configuration, the computing device 500 includes at least one processing unit 502 and system memory 504. Depending on the exact configuration and type of computing device 500, the system memory 504 may be volatile (such as RAM), non-volatile (such as ROM and flash memory) or some combination of the two. The system memory 504 typically includes an operating system 506, one or more program modules 508, and may include program data 510.

For the present VoIP processes, the program modules 508 may include the process modules 509 that realize one or more the processes described herein. Other modules described herein may also be part of the program modules 508. As an alternative, process modules 509, as well as the other modules, may be implemented as part of the operating system 506, or it may be installed on the computing device and stored in other memory (e.g., non-removable storage 522) separate from the system memory 506.

The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 520 and non-removable storage 522. Computer storage media may include volatile and non-volatile, removable and non-removable media implemented in any method or technology for storage of information, such as computer readable instructions, data structures, program modules, or other data. The system memory 506, removable storage 520 and non-removable storage 522 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of the device 500. Computing device 500 may also have input device(s) 524 such as keyboard, mouse, pen, voice input device, and touch input devices. Output device(s) 526 such as a display, speakers, and printer, may also be included. These devices are well know in the art and need not be discussed at length.

The computing device 500 may also contain a communication connection 528 that allow the device to communicate with other computing devices 530, such as over a network like network 106 of FIG. 1. Communication connection(s) 528 is one example of communication media. Communication media may typically be embodied by computer readable instructions, data structures, program modules, or other data in a modulated data signal, such as a carrier wave or other transport mechanism, and includes any information delivery media.

Various modules and techniques may be described herein in the general context of computer-executable instructions, such as program modules, executed by one or more computers or other devices. Generally, program modules include routines, programs, objects, components, data structures, and so forth. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Alternative Implementations

One or more additional VoIP talk buttons may be used on a web page hosted by the website 104. These additional VoIP talk buttons may enable a customer to contact an agent that is responsible for handling specific customer questions, concerns, etc. For example, an additional VoIP talk button may enable a customer to establish a VoIP communications session with a billing agent, another additional VoIP talk button may enable a customer to establish a VoIP communications session with a service agent, and so forth. Regardless of the type of agent contacted, delivery of product data and information to the agent may occur before the VoIP communications session begins.

The described implementations may also function when a customer has more than one virtual shopping cart associated with unique identification data (e.g., a user ID or a temporary ID). Each of the virtual shopping carts may be assigned a cart number and linked to the customer's unique identification data. When a customer selects a VoIP talk button, according to the described implementations, an agent receives data and information associated with the products in each of the shopping carts.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer storage medium having computer executable instructions that, when executed by a computer, cause the computer to perform a method, the method comprising:

detecting a request made by an entity to establish a Voice over Internet Protocol (VoIP) communications session establishing VoIP session parameters;

retrieving shopping cart data associated with one or more items listed in a virtual shopping cart in response to the request to establish the VoIP communications session;

identifying one or more supplemental items related to the one or more virtual shopping cart items, the supplemental items unique from the virtual shopping cart items;

retrieving supplemental data associated the supplemental items in response to the request to establish the VoIP communications session;

delivering the supplemental data items to an agent for recommendation to the entity;

bundling the shopping cart data and the supplemental data with the VoIP session parameters usable to establish a VoIP communications session with the entity; and enabling the agent to establish a VoIP communications session with the entity.

2. A method as recited in claim 1 further comprising displaying the shopping cart data and the supplemental data on a display device associated with the agent at substantially the same time that the VoIP communications session is established.

3. A method as recited in claim 1, further comprising displaying the shopping cart data and the supplemental data on a display device before the VoIP communications session is established.

4. A method as recited in claim 1, further comprising linking the shopping cart data to the entity requesting the VoIP communications session using unique identification data associated with the entity.

5. A method as recited in claim 4, wherein the unique identification data is a unique username linked to the entity.

6. A method as recited in claim 4, wherein the unique identification data is temporary identification data linked to the entity.

7. A method as recited in claim 1, wherein the one or more items listed in a virtual shopping cart are products offered for sale on a web page.

8. A computer storage medium having computer executable instructions that, when executed by a computer, cause the computer to perform a method, the method comprising:

adding information associated with one or more first items to a first virtual shopping cart;

adding information associated with one or more second items to a second virtual shopping cart;

assigning a unique identifier associated with an entity to the information associated with the one or more items of the first virtual shopping cart;

assigning the unique identifier to the information associated with the one or more items of the second virtual shopping cart;

detecting a request to establish a Voice over Internet Protocol (VoIP) communications session, the request made by the entity;

retrieving the information associated with the both the first items of the first virtual shopping cart and the second items of the second virtual shopping cart via the unique identifier, the information retrieved in response to detecting the request to establish a VoIP communications session;

bundling the information with VoIP session parameters usable to establish a VoIP communications session between the entity and an agent; and receiving a recommendation, via the agent, of one or more supplemental items for the entity, the one or more supplemental items related to at least one of the first items, and the one or more supplemental items unique from the first items.

9. A method as recited In claim 8, further comprising delivering the bundled information, the supplemental items, and VoIP session parameters to the agent that is affiliated with a website that offers the one or more items for purchase.

10. A method as recited in claim 8, further comprising displaying: (1) the information associated with the first items, (2) the information associated with the second items, and (3) information associated with the supplemental items, wherein the displaying is displayed on an agent computing device affiliated with the agent.

11. A method as recited in claim 8, wherein the unique identifier is assigned to the entity after the entity completed a website registration process.

12. A method as recited in claim 8, wherein the unique identifier is associated with a customer of a website that has completed a registration process.

13. A system, comprising:

at least one server hosting a website, the website including:

a plurality of products for sale;

a virtual shopping cart containing data associated with at least one of the products for sale, the virtual shopping cart associated with a first entity; and at least one Voice over Internet Protocol (VoIP) button that facilitates instantiation of a VoIP communications session, the VoIP button associated with at least one of the plurality of products for sale, wherein actuation of the VoIP button by the first entity causes the virtual shopping cart data and data relating to the products associated with the VoIP button to be retrieved and bundled with instantiation of an open VoIP communications session between the first entity and a second entity.

14. A system as recited in claim 13, further comprising a database coupled to the at least one server, the database storing at least the information associated with the plurality of products for sale.

15. A system as recited in claim 13, further comprising a VoIP server that establishes the VoIP communications session.

* * * * *